United States Patent [19]

Merrell

[11] 3,775,691

[45] Nov. 27, 1973

[54] LOGIC CONTROL CIRCUIT

[75] Inventor: Richard G. Merrell, Darien, Ill.

[73] Assignee: Zenith Radio Corporation, Chicago, Ill.

[22] Filed: Dec. 1, 1971

[21] Appl. No.: 203,571

[52] U.S. Cl. .......... 328/48, 307/221, 328/63

[51] Int. Cl. .......... H03k 21/32

[58] Field of Search .......... 307/221, 269; 328/48, 62, 63, 75, 129

[56] References Cited

UNITED STATES PATENTS

| | | | |
|---|---|---|---|
| 2,519,184 | 8/1950 | Grusdoff | 328/48 |
| 3,096,483 | 7/1963 | Ransom | 328/48 |
| 3,226,568 | 12/1965 | Samwel | 328/129 X |
| 3,383,525 | 5/1968 | Arksey | 328/48 X |
| 3,697,879 | 10/1972 | Holliday | 328/48 X |
| 3,291,910 | 12/1966 | Nicklas et al. | 307/221 X |
| 2,937,337 | 5/1960 | Jones et al. | 328/48 |
| 3,173,094 | 3/1965 | Hoegeman, Jr. | 307/221 X |
| 3,097,340 | 7/1963 | Dobbie | 328/63 |
| 2,990,451 | 6/1961 | Stoffels | 307/221 X |
| 3,241,033 | 3/1966 | Peaslee et al. | 307/221 X |
| 3,358,068 | 12/1967 | Campbell, Jr. | 328/62 X |
| 3,471,790 | 10/1969 | Kaps | 328/63 |

*Primary Examiner*—John W. Huckert
*Assistant Examiner*—R. E. Hart
*Attorney*—John H. Coult and John J. Pederson

[57] ABSTRACT

A circuit for controlling the inhibit logic stage of a subscription television system encoder or the like generates a series of control pulses at predetermined intervals following receipt of an initial command pulse. The generator comprises a counter having a plurality of individual counting states corresponding to generation of respective ones of the control pulses. Once the counter has assumed its initial counting state in response to receipt of a command pulse, a novel input circuit enables a source of stepping pulses to continue the counting cycle until the final counting state is reached, at which time further application of stepping pulses is terminated.

3 Claims, 3 Drawing Figures

LOGIC CONTROL CIRCUIT

BACKGROUND OF THE INVENTION

This application is directed to subscription television encoding systems, and more particularly to an improved circuit for controlling the inhibit logic circuitry contained therein.

In a preferred subscription television system such as that described in detail in U.S. Pat. No. 3,244,806, issued Apr. 5, 1966 to George V. Morris and assigned to the present assignee, a transmitted video signal is protected against unauthorized reception by switching it between one operating mode, wherein the video signal is delayed, and another operating mode wherein it is translated without delay. The mode changes are made several times during each field in response to the amplitude variations of a rectangular-shaped switching signal developed in an encoder at the studio, giving the effect of a plurality of alternately displaced horizontal bands across the coded picture. As a further protection against unauthorized reception, the phase of the rectangular switching signal is varied randomly at random intervals, in response to a series of random-state control pulses from an inhibitable random pulse generator, giving a jittered effect to the picture as the alternately displaced bands vertically shift position in a random manner.

In order to decode this signal for application to a subscriber's television receiver, it is necessary to reconstruct within a decoder in the subscriber's home a rectangular switching signal in exact phase synchronism with its randomly varying parent at the studio. To this end, a series of synchronizing bursts are periodically transmitted in time coincidence with the random control pulses and at discrete frequencies representative of the state thereof. To maintain system security it is desirable that the number of frequencies of these synchronizing bursts be varied in a random manner and with redundancy, subject only to certain inhibitions recognizable in reconstructing the rectangular switching signal. These inhibitions are necessarily reflected in the generation of the control pulses, and it is to a control circuit for controlling the timing and duration of the inhibitions as applied to the inhibitable random pulse generator that the present application is directed.

SUMMARY OF THE INVENTION

Accordingly, it is an object of the present invention to provide a new and improved circuit for controlling the inhibit logic stage of a subscription television system or the like.

It is a specific object of the invention to provide a new and improved inhibit logic control circuit which is less complicated and more economical to construct.

It is a still more specific object of the invention to provide a control circuit for generating a series of control pulses within a predetermined time interval in response to an appied command pulse.

In accordance with the invention, a control circuit for generating a series of pulses within a predetermined time interval in response to a command pulse preceding the interval comprises a counter responsive to an applied signal for stepping from a reset state through a series of predetermined counting states including initial and final states, means for applying the command pulse to the counter to step the counter from the reset state to the initial counting state at the beginning of the predetermined time interval, a source of recurrent stepping pulses, means for applying the stepping pulses to the counter after the counter reaches the initial state to step the counter from the initial state to the final state, switch means for interrupting the application of the stepping pulses to the counter when the counter assumes the final state, and means responsive to the counting state of the counter for generating the series of pulses as the counter advances from the initial state to the final state.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings and in which:

DESCRIPTION OF THE PREFERRED EMBODIMENT

Before considering the inhibit logic control circuit of the invention, it is desirable to have a general working knowledge of the video encoder portion of the system in which it is employed. To this end, a preferred encoder is depicted in block diagram form in FIG. 1.

Figure 1:
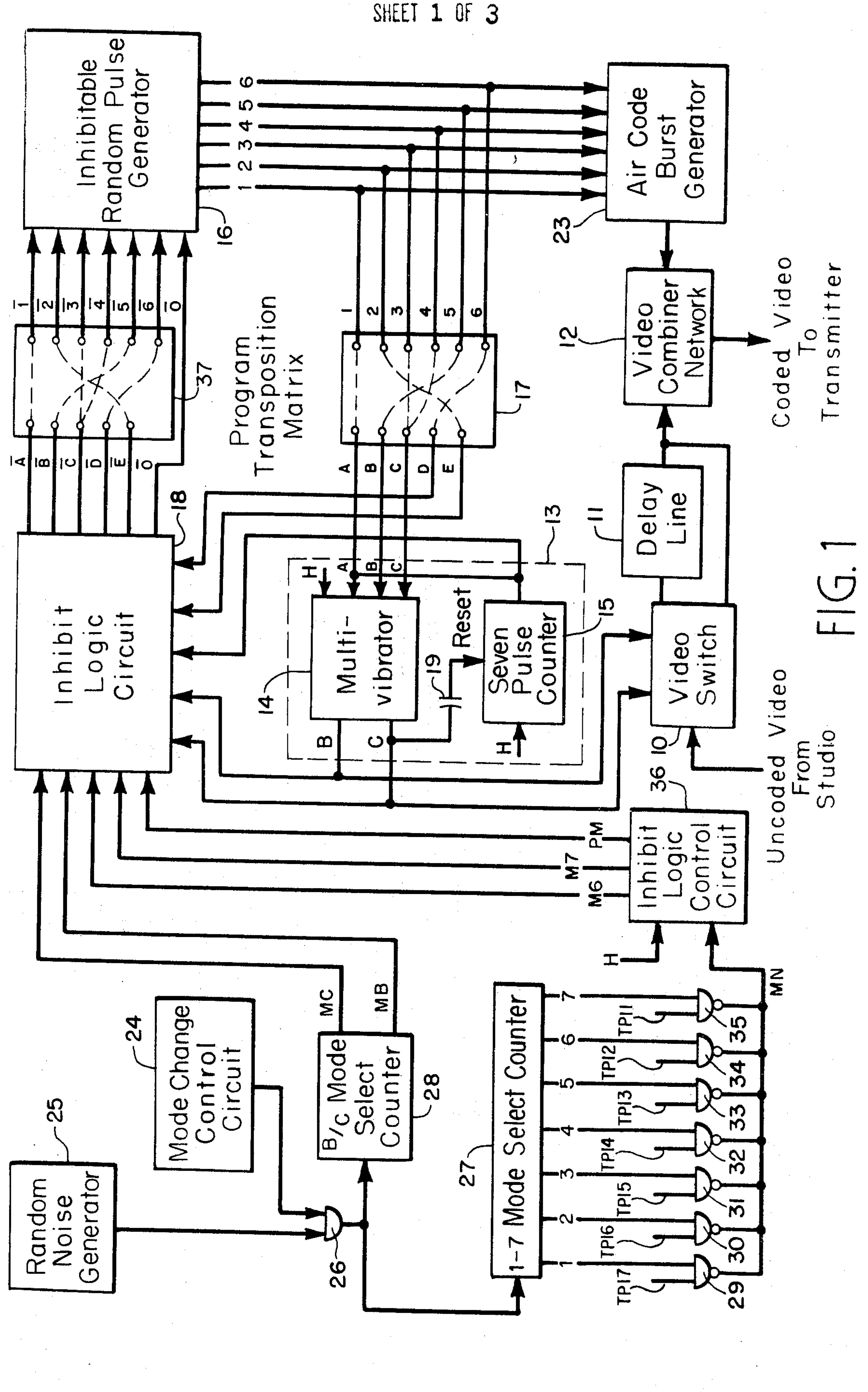
FIG. 1 is a block diagram of an encoder for a subscription television system embodying the present invention.

It will be recalled that prior to transmission in a preferred subscription television system the video signal is encoded by switching it alternately between delayed and undelayed modes several times during each field in response to a locally generated phase-varying rectangular switching signal. In the encoder of FIG. 1, encoding is accomplished by applying the uncoded video from the studio cameras and film chains to a video switch 10, which may comprise a pair of diodes alternately biased conductive and non-conductive or equivalent switching circuitry for directing the video signal to one of two outputs. One output of switch 10 is coupled to a delay line 11, which in accordance with current practice delays the video by approximately 1.675 $\mu$sec, or the duration of 6 cycles at the color subcarrier frequency. The other output is coupled through an appropriate matching network to a combining network 12. wherein the undelayed video is combined with the delayed video prior to further amplification and processing in the transmitter.

Video switch 10, after introducing a delay of one line to accommodate a like delay in decoding the synchronizing bursts in the decoders, switches between its two output states in response to a rectangular switching signal, which is generated by a mode square wave generator 13. Contained within generator 13 is a multivibrator 14 having two alternate quiescent states, hereinafter referred to as B and C. The push-pull output of multivibrator 14 is coupled via a pair of conductors to video switch 10 wherein it controls the functioning of that device.

Multivibrator 14 is not free-running, but instead switches between its two states in response to external control pulses applied to its three inputs, hereinafter designated A, B and C. The A input constitutes a toggle input, and pulses applied to this input cause the multivibrator to change state regardless of its present state. The B and C inputs force the multivibrator to transition to like-designated states only if it is in the opposite state, otherwise no change occurs. To generate the rectangular switching signal, the output of a seven pulse counter 15 is coupled to input A. This counter counts horizontal pulses, and following the occurrence of every seventh horizontal pulse generates a control pulse which toggles the multivibrator. This in effect makes generator 13 free-running, changing the mode of video switch 10 every seven lines to form alternately delayed and undelayed seven-line-wide horizontal bands across the picture.

To introduce an element of randomness into the system, the phase of the rectangular switching signal is randomly shifted. This is accomplished by means of an inhibitable random pulse generator 16, which periodically generates in 10 predetermined time slots in each vertical retrace interval a series of 10 control effects each representative of a random one of seven possible counting states; six of these manifested in the form of a pulse on a respective one of six output terminals, and the seventh in the form of no output pulse at all. The six pulses are assigned certain functions, among them being the control of mode square wave generator 13. This assignment is accomplished by means of a program transposition matrix 17, which has the capability of coupling any of the six pulse outputs of generator 16 to any of five function circuits, to introduce an additional permutation level into the system for program identification and billing purposes. The five function circuits are arbitrarily designated A, B, C, D and E. A, B and C connect to their like-lettered inputs on multivibrator 14, and D and E connect to end-of-program and correlation control circuitry, respectively, in an inhibit logic circuit 18 which will be discussed later. In the encoder of FIG. 1, matrix 17 has been wired so that a one pulse from random pulse generator 16 toggles multivibrator 14 at its A input, a three pulse forces multivibrator 14 to its C state, and a five pulse forces multivibrator 14 to its B state. Thus the possiblility exists that the mode of generator 13 will be changed whenever one of these pulses is generated, depending on the state of multivibrator 14 at the time of generation.

In practice, multivibrator 14 is actually a two-stage circuit, comprising an input stage and an output or buffer stage. Pulses from generator 16 are applied to the input stage only during the ten time slots of the air code burst interval, i.e., the portion of the vertical retrace interval reserved for effecting phase changes in the rectangular switching signal. During each of these ten time slots the input stage of multivibrator 14, which may comprise a conventional J-K flip-flop, changes state in response to the occurrence of A, B, or C pulses from generator 16, finally assuming as a result of these pulses a B or C state at the end of each slot. The changes of state of the input stage are prevented from appearing at the output of multivibrator 14 by the buffer stage, which is gated to assume the state of the input flip-flop only during horizontal retrace intervals. This stage may take the form of a conventional J-K flip-flop having its J and K input terminals coupled to the Q and $\bar{Q}$ output terminals of the input flip-flop and its clock terminal coupled to a source of horizontal retrace pulses. With this arrangement the output of multivibrator 14 is changed only during horizontal retrace intervals to the state finally assumed by the input flip-flop at the end of the preceding time slot.

Once the output state of multivibrator 14 has been thus determined, it remains in that state throughout the succeeding time slot, notwithstanding that its input stage may be responding to pulses from generator 16 towards determining the state for the next time slot. This process takes place 10 times during each vertical retrace interval; corresponding to respective ones of the ten time slots of the air code burst interval.

Once the air code burst interval has ended, seven pulse counter 15 continues to toggle multivibrator 14 every seventh horizontal line to sustain the rectangular switching signal for the duration of the succeeding field. To insure that following the air code burst interval multivibrator 14 will run at whatever phase is established by the preceding 10 control effects from inhibitable random pulse generator 16, and not be returned to its previous phase by the first output from seven pulse counter 15, a reset of counter 15 is automatically accomplished following each C to B transition forced by the pulses from generator 16 during the air code burst interval. This is accomplished circuit-wise by a capacitor 19 connected between the C ouptut of multivibrator 14 and the reset input of seven pulse counter 15, which together with the internal impedance of the counter form a differentiating network for converting C to B transitions to suitable reset pulses.

The final phase of the rectangular switching signal depends only on the final C to B transition, or phase transition point, since it is only that transition which resets the seven pulse counter to establish a new free-running phase. This can better be seen in FIG. 2, which is a timing chart of various encoder signals during the phase change portion of a vertical retrace interval. The vertical interval is seen to comprise 24 timing slots, each one a single horizontal line in duration and consecutively numbered 1 thorugh 24. The air code burst interval occupies slots 11 through 20 inclusive, and it is during these 10 slots that the phase-determining pulses are generated. For purposes of explanation we will assume that generator 16 produced the illustrated series of pulses during this interval; namely AECCOBBCOC, with O indicating the absence of a pulse.

The phase of the rectangular switching signal has come to be designated as a mode identified with a single numeral and a single letter; the numeral specifying the number of time slots the phase (or mode) transition point (or last reset of the seven pulse counter) precedes the end of the air code burst interval, and the letter indicating the instantaneous state (B or C) of the rectangular switching signal at the end of the air code burst interval. Since seven pulse counter 15 toggles multivibrator 14 every seven lines, the rectangular switching signal has a period of 14 lines or time slots, and hence 14 possible modes; 1B-7B and 1C-7C.

Figure 2:
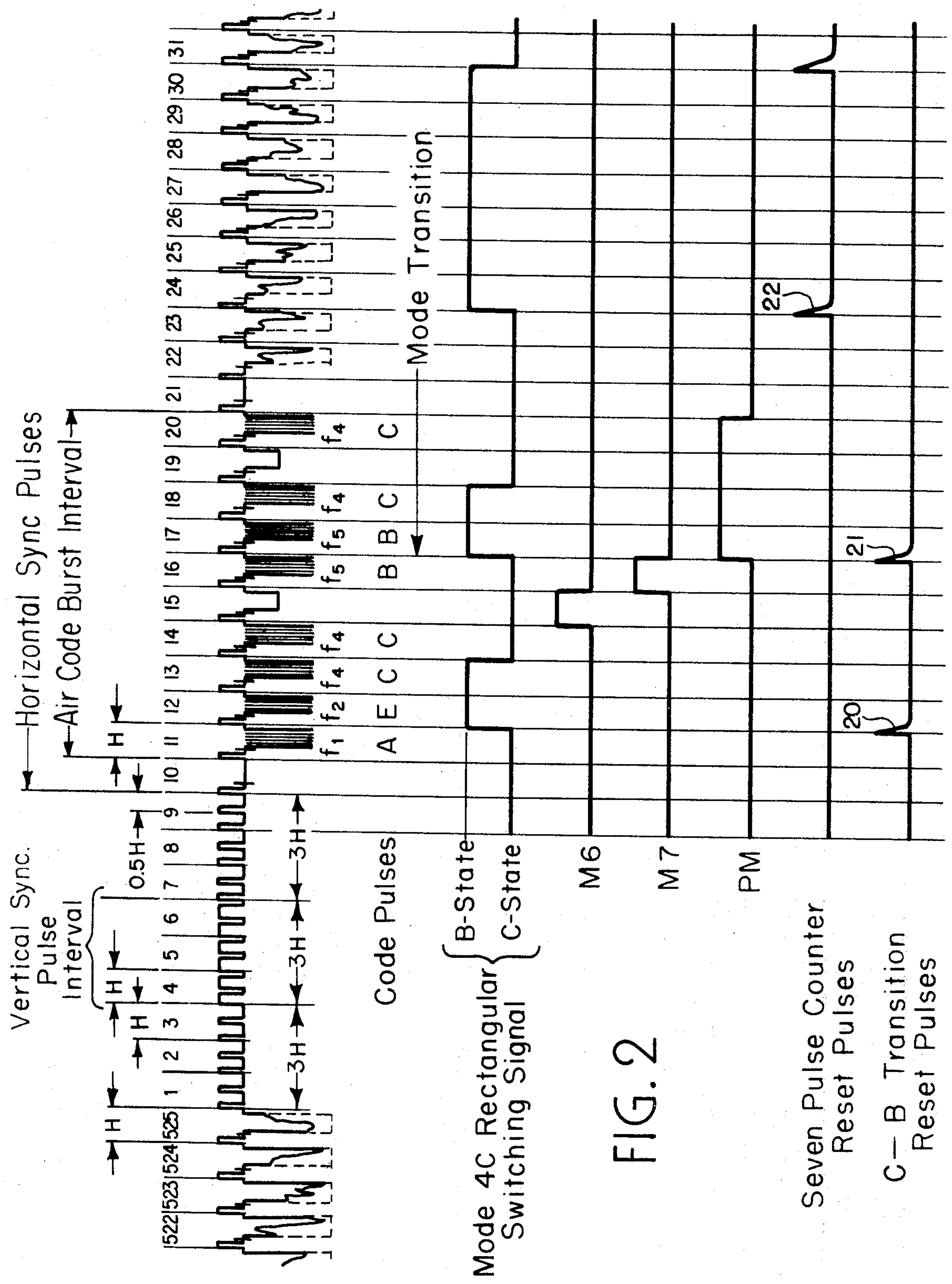
FIG. 2 is a graphical representation of signal waveforms useful in understanding the operation of the encoder of FIG. 1.

Reference is now made to the mode 4C waveform of FIG. 2, which was generated by the aforementioned series of pulses in a manner now to be described. The A pulse generated by generator 16 in time slot 11 toggles multivibrator 14, forcing the rectangular switching signal to transition from its C to B state between slots 11 and 12 and producing a reset pulse 20 for seven pulse counter 15. The correlation E pulse in slot 12 caused no change, and the C pulse in slot 13 forced a B to C transition between slots 13 and 14. The C pulse in slot 14 caused no change, since the rectangular switching signal was already in the C state. There was no pulse in slot 15, and hence no change. The B pulse in slot 16 forced a C to B transition between slots 16 and 17, the mode transition point for mode 4C operation, producing a reset pulse 21 which again reset seven pulse counter 15. The B pulse in slot 17 produced no change, and the C pulse in slot 18 forced a B to C transition. The absence of a pulse in slot 19 and the C pulse in slot 20 produced no change, leaving the rectangular switching signal in a C state at the end of the air code burst interval and seven pulse counter 15 with a four count as required by mode 4C. The switching signal remained in a C state until three time slots later, when seven pulse counter 15 reached a seven count and produced an output pulse 22 which toggled multivibrator 14 to its B mode. For the balance of the vertical scanning cycle counter 15 periodically toggled multivibrator 14 every seven horizontal lines, thus maintaining the rectangular switching signal in the 4C mode during the successive field and at least until the next vertical retrace interval.

In order for the decoder to decode the encoded signal at the subscriber's receiver it is necessary that the decoder locally reconstruct the rectangular switching signal at the same frequency and phase that it was generated at by multivibrator 14. To this end each of the output terminals 1–6 of random pulse generator 16 is connected to an assigned one of six gated discrete-burst-frequency oscillators in an air code burst generator 23. These six oscillators each have gated input stages, in the form of conventional J-K flip-flops the input terminals of which are coupled to respective ones of output terminals 1–6 of random pulse generator 16, and the clock control terminals of which are coupled to a source of horizontal retrace pulses. Thus connected, the input flip-flops perform in a manner similar to multivibrator 14, recognizing only the final output state of generator 16 as it exists upon the occurrence of the horizontal retrace interval following a horizontal scanning interval time slot.

Since it is possible for one and only one output pulse to be generated at one time by generator 16, it is possible for only one of the six input flip-flops to assume a transfer state during a particular retrace interval. Furthermore, once an input flip-flop has assumed its transfer state, it will remain in that state until the next horizontal retrace interval clock pulse, at which time it will return to its quiescent state if generator 16 has assumed a different output state.

While the input flip-flop is in its transfer state, conventional gated oscillator circuitry produces a discrete-frequency burst signal in the range of 500–1,000 kHz. This burst, necessarily of at least one time slot in duration, is combined with the composite video signal in combiner network 12 prior to transmission to the decoders. Thus, for each output pulse generated by generator 16, a burst signal is transmitted in the following time slot at a discrete frequency indicative of the particular generator output terminal the pulse appeared on. In all, ten such bursts may be transmitted for each air code burst interval, one in each of the 10 reserved time slots. Only when generator 16 generates a 0 or no output control effect will no burst be produced. In the decoder frequency selective detectors convert the bursts back into code pulses on six respective terminals from which the rectangular switching signal is reconstructed in a manner complementary to the generation process just described.

In practice, it is not desirable to leave the rectangular switching signal mode selection purely to the haphazard appearance of ten pulses, since that would involve the likelihood of a mode change with every field. Instead, the encoder includes circuitry which inhibits the operation of the random pulse generator to the extent necessary to force a particular switching signal mode for a predetermined average time interval. For instance, assuming that it is desired to continue to operate for a while with a rectangular switching signal of the 4C mode as in FIG. 2, it is necessary to reset the seven pulse counter at the mode transition point between time slots 16 and 17. In order for this to occur, the rectangular switching signal must transition from a C state in time slot 16 to a B state in time slot 17 to obtain a C to B transition. Since the pulse generator is normally completely random, the only way to insure this transition is to inhibit the generator from producing certain output pulses which would not force the required transition. Specifically, during time slot 15, A and B pulses are inhibited since these would prevent the necessary C state in time slot 16. In time slot 16 the rectangular switching signal must transition to the B state, so C, D, E and O pulses are inhibited. Once the transition has taken place, it is necessary to insure that a C state will exist in time slot 20, so A and B are inhibited, the only two outputs which would if generated change the already existing C state to a B state.

It must be understood that in inhibiting a particular output pulse from random pulse generator 16, the inhibited output state is actually removed from the random selection and th chances for one of the other states being selected are improved. This makes it possible to force a particular output pulse by inhibiting all other states from consideration.

While the mode of the rectangular switching signal could be set manually by means of a pair of switches designating the numeric portion 1–7 and the terminal state B/C of the mode, it is preferable for security reasons to randomly select a new mode at random intervals of predetermined average duration during normal operation of the system. To this end the encoder includes a mode change control circuit 24 which produces a control signal at random intervals of predetermined average duration for initiating a change in the rectangular switching signal mode. A preferred circuit for this purpose is covered in the co-pending application of Hyacint E. Harna, Serial No. 195,344, which is also assigned to the present assignee. The control signal is applied to one input of an AND gate and serves as an enabling signal for that device. When and only when control circuit 24 calls for a mode change, a random selection of a new mode is accomplished by feeding random noise pulses from a noise generator 25 through an AND gate 26 and into a seven-position mode select counter 27 and a two-position B/C mode select counter 28 for a predetermined period of time. When the counting period has ended, the seven-position counter will unpredictably occupy one of its seven states, thus randomly designating the numeric portion of the new operating mode. Similarly, the two stage counter will occupy one of its two states, thus randomly designating whether the new mode will be a B mode or a C mode.

The 1–7 numeric selection of the counter appears as a single enabling signal at a respective one of seven output terminals. These terminals are in turn connected to respective ones of seven NAND gates 29–35, the other inputs of the gates being connected to sources of timing pulses occurring three time slots prior to the particular time slot in which the mode associated with the particular seven position counter output calls for a mode change. For example, should the counters call for a mode 4C rectangular switching signal, the 4 output terminal only of counter 27 would be high, enabling only NAND gate 32. The other input of gate 32 is connected to a source of timing pulses coinciding with time slot 14, henceforth designated TP14. The outputs of gates 29–35 are connected together to form a common output consisting of a single MN command pulse three time slots prior to the mode change point. The MN command pulse, in this case TP14, is applied to a novel inhibit logic control timing circuit 36, which responds to the command pulse by generating an M6 control pulse three time slots prior to the mode change, an M7 control pulse two time slots prior to the mode change, and a post-mode or PM control pulse between one time slot prior to the mode change and the end of the air code burst interval. These assignments take into account the one-line delays introduced by multivibrator 14 and air code burst generator 23. In our example M6 would coincide with slot 14, M7 with slot 15, and MN with slots 16–20, inclusive. These three control pulses, together with the output of the B/C counter, are applied to inhibit logic circuits 18 and utilized therein to set up the necessary function inhibit signals preceding and following the mode change.

In determining which functions are to be inhibited, logic cirucis 18 take into account the desired mode via the M6, M7, PM and B/C counter output signals, the present state of the rectangular switching signal via the B and C ouptuts of multivibrator 14, and the prior occurrence of D and E pulses to determine whether a correlation or end of program pulse can or should be transmitted during a particular air code burst interval. The output of logic circuits 18 is in the form of inhibit pulses for the various functions, namely $\bar{A}$, $\bar{B}$, $\bar{C}$, $\bar{D}$, $\bar{E}$ and $\bar{O}$. With the exception of the $\bar{O}$ signal, which is coupled directly, these function inhibit signals become inhibit signals for the six possible output states 1–6 of random pulse generator 16 by means of a second program transposition matrix 37, which couples the function inhibit signals to appropriate inhibit inputs $\bar{1}$–$\bar{6}$ of generator 16 with the same permutations provided by matrix 17. Thus, when inhibit logic circuit 18 calls for no B to be transmitted during a particular one of the ten air code burst interval time slots, it outputs a $\bar{B}$ signal which becomes a 5 signal and prevents random pulse generator 16 from generating a $\bar{5}$ pulse during that time slot.

Having considered the operation of the encoder as a system, we are now in a position to consider in detail the novel circuitry of inhibit logic circuit 36. It will be recalled that the function of this circuit is to generate three control pulses for inhibit logic circuit 18; an M6 control pulse three time slots prior to mode change, an M7 control pulse two time slots prior to mode change, and a post mode or PM control pulse occurring between one time slot prior to mode change and time slot 20 at the end of the air code burst interval. These pulses are utilized by logic circuits 18 to set up necessary function inhibit signals for application to inhibitable random pulse generator 16 immediately preceding and following the mode change.

The operation of circuit 36 is necessarily responsive to the generation of an MN command pulse at one of the outputs of gates 29–35, inclusive. This command pulse occurs three time slots prior to mode change and in the present embodiment is a negative pulse one time slot in duration. Its sole purpose is to initiate the pulse generation cycle in control circuit 36 so that inhibit logic circuit 18 can generate, in conjunction with the B/C mode selection of counter 28, the necessary inhibit signals for inhibitable random pulse generator 16.

Figure 3:
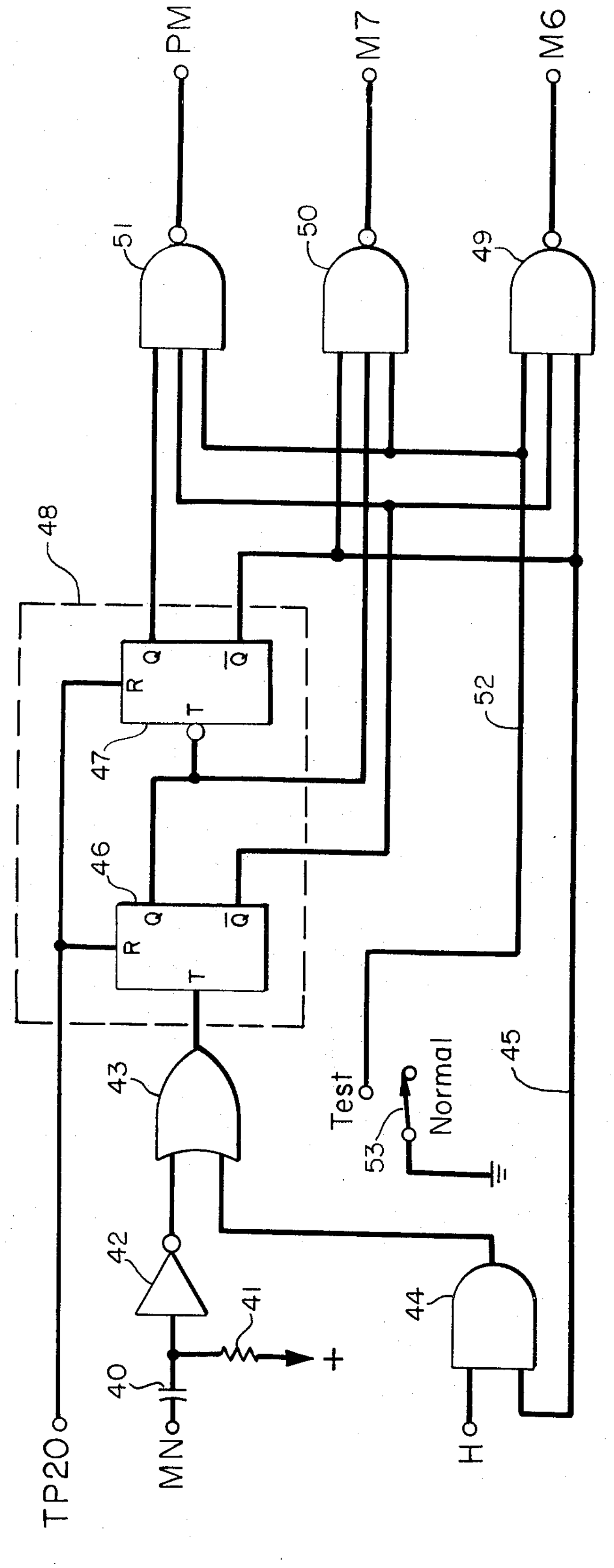
FIG. 3 is a schematic diagram, partially in block diagram form, of a control circuit constructed in accordance with the invention.

Referring now to FIG. 3, the MN command pulse appears on a like-designated input terminal and is coupled from there to a source of positive-polarity unidirectional current by a differentiating network serially comprising a capacitor 40 and a resistor 41. This network forms at its juncture in a manner well known to the art a relatively narrow negatively-extending pulse substantially time coincident with the leading edge of the MN pulse, and a positively-extending pulse at the trailing edge of the MN pulse. The two pulses thus developed are coupled to an inverter 42, wherein the leading edge pulse is inverted prior to application to one input of a two input logical OR gate 43, which serves as means for applying the pulse. The other input of gate 43 is coupled to the output of switch means in the form of a two-input logical AND gate 44, which has one input coupled to a source of recurrent stepping pulses in the form of positive-polarity horizontal retrace pulses, and its other input connected to a control line 45, which serves to control the translation of signals through gate 44 in a manner to be presently explained. It will be appreciated that in certain applications it may be desirable to use negative output AND and OR gates (NAND and NOR gates) in place of gates 43 and 44, respectively, the two types being functionally equivalent except for the polarity of their output.

The output of OR gate 43, which it will be appreciated can comprise pulses derived from either the differentiating circuit or the horizontal retrace pulse source, is coupled to the toggle input of a bistable counting element, which may be a conventional J-K flip-flop 46 connected in the toggle mode. The Q output of this flip-flop is coupled to the toggle terminal of a second flip-flop 47, the two slip-flops thereby forming a two-stage binary counter 48 for stepping through a series of four cyclical counting states as appropriate positive-polarity pulses are applied to the toggle input of flip-flop 46.

Each of the J-K flip-flops, as is well known to the art, has first and second stable operating states. These states are generally defined in terms of high and low voltage conditions on the output terminals of the flip-flops, a high voltage condition being approximately the reference or supply voltage, generally in the order of 5.0 volts for the most common logic elements, and a low voltage condition being some value less than reference, generally near or equal to 0 volts or ground potential. In the discussion to follow we will define the first or so-called high state of the J-K flip-flops as that where their Q output terminal is high and their $\bar{Q}$ output terminal is low, and the second or so-called low state as that where Q is low and $\bar{Q}$ high. As is also well known to the art, Q and $\bar{Q}$ are always opposite gender, and a pulse of appropriate polarity applied to the toggle input of a flip-flop always causes a change in state and hence a reversal in gender of Q and $\bar{Q}$. It should also be noted that when referring to the polarity of a pulse, reference is being made to the direction the pulse extends, and not necessarily to the actual direct current polarity of the circuit carrying the pulse. Flip-flops 46 and 47 may be identical except that flip-flop 46 responds only to positively-extending toggle pulses, whereas flip-flop 47 responds only to negatively-extending toggle pulses, as indicated by the small circle at the toggle input terminal location on its symbol in FIG. 3.

Assuming an initial 0 count or reset state wherein both flip-flops are reset, i.e., Q output terminal high and $\bar{Q}$ output terminal low, the first positive pulse applied to the toggle input of flip-flop 46 causes that device to change state, its Q output terminal transitioning from high to low. This negative excursion serves in turn to toggle flip-flop 47, causing that device to also transition from a high to a low state. Thus, both flip-flops transition to a low state with the first applied pulse, establishing the so-called initial counting state of counter 28.

The second pulse applied to flip-flop 46 again toggles that device, but this time its Q output transitions from low to high, a positive excursion which is not recognized by flip-flop 47. As a result, after the second pulse flip-flop 47 is in its low state and flip-flop 46 is in its high state, establishing the second counting state of counter 48. The third pulse applied to flip-flop 46 again toggles that device, forcing a high to low transition at its Q output terminal. This transition is recognized by flip-flop 47, which transitions to its high state, leaving flip-flop 46 low and flip-flop 47 high. This is the third and final counting state of counter 48.

The aforedescribed counting action of counter 48 is utilized to provide the desired M6, M7 and PM control pulses by means comprising a trio of three-input logical NAND gates 49, 50 and 51. These gates function in a manner well known to the art, their output terminal being low if and only if all of their input terminals are high; or conversely, their output terminal being high if any one or more of their input terminals is low. In certain applications it may be desirable to use AND gates for this purpose, as where the output inversion of the NAND gates is not necessary or desirable.

Gate 49, associated with generation of the M6 pulse, has one of its inputs coupled to the $\bar{Q}$ output of flip-flop 47 and another of it inputs coupled to the $\bar{Q}$ output of flip-flop 46. The remaining input is connected to a control line 52 which, as will presently be explained, presents an inhibiting input to each of the three gates only when the encoder is being operated in a test mode. Gate 49 is open only when its three inputs are all high, and from our previous discussion it will be apparent that this occurs only in the initial counting state, i.e., after application of the first pulse to flip-flop 46 when both flip-flops are low. Thus, during the initial counting state the output of gate 49 is low, generating the desired M6 control pulse, and the outputs of gates 50 and 51 are high by virtue of one or more of their inputs being low to prevent the generation of extraneous control pulses.

The M7 control pulse is generated in a similar manner by NAND gate 50. One input of gate 50 is coupled to the $\bar{Q}$ output of gate 47 and another input is coupled to the Q output of gate 46. As with gate 49, the third and remaining input of gate 50 is coupled to control line 52. With this arrangement the output of gate 50 is low if and only if flip-flop 47 is low and flip-flop 46 is high, a condition fulfilled only when counter 48 is in its second counting state. Since this occurs after application of the second toggle pulse to flip-flop 46, the output of gate 50 forms the desired M7 control pulse.

The post-mode or PM pulse is also generated with a single gate. The output of gate 51 is low if and only if flip-flop 46 is low and flip-flop 47 is high, a condition possible only in the third and final counting state of counter 48. The resulting output comprises the deisred PM control pulse, which like M6 and M7, is coupled to inhibit logic cirucit 18.

To insure that counter 48 will always start counting from a 0 counting state, i.e., flip-flops 46 and 47 reset to a high state, the flip-flops are all reset during time slot 20, which it will be recalled follows the air code burst interval. This is accomplished by a positive polarity TP20 timing pulse applied to the reset terminals of the two devices. Once reset, the counter remains in the reset state until receipt of the next MN command pulse, after which the pulse generating cycle is begun anew.

The $\bar{Q}$ output of flip-flop 47 is also coupled to control line 45, which it will be recalled is connected to one of the inputs of AND gate 44 for the purpose of selectively inhibiting its operation. In accordance with one aspect of the invention, this connection prevents horizontal retrace stepping pulses from being applied to counter 48 until the MN pulse has been received, and after the third counting state has been reached. This result obtains because only prior to receipt of an MN pulse or after application of a third pulse to counter 48 is flip-flop 47 in a high or reset state with its $\bar{Q}$ output terminal low, the necessary condition for inhbiting gate 44.

In operation, an MN command pulse is received three time slots prior to mode change. The leading edge of this pulse is, after differentiation by capacitor 40 and resistor 41, and inversion by inverter 43, applied to OR gate 43. After translation through this device, it advances counter 48 from its reset state to its initial counting state wherein flip-flops 46 and 47 both assume a low state.

Since the $\bar{Q}$ output of flip-flop 47 is now high, horizontal retrace pulses are applied through AND gate 44 to the toggle input of flip-flop 46 via OR gate 43. These pulses step counter 48 through its second and third counting states, generating M7 and PM control pulses in the process. As the counter reaches the third and final counting state, the $\bar{Q}$ output of the flip-flop 47 transitions from high to low. This transition, by virtue of control line 45, prevents further application of horizontal retrace pulses to counter 48. As a result, counter 48 remains in the third counting state, while at the same time generating the PM pulse. This continues until time slot 20, at which time TP20 timing pulses applied to the reset terminals of flip-flops 46 and 47 reset the counter to a 0 count condition and terminate the PM pulse.

Thus, the logic control circuit of the invention, when triggered by an applied command or input pulse, generates a train of output pulses suitable for controlling the logic circuitry of inhibit logic circuits 18. The cycle is self-completing, the circuit returning to a 0 or no output state after it has completed its cycle. The proposed circuit is reliable and economical to construct, and makes maximum use of available parts to keep the cost of construction low. A differentiating network is included in the circuit to generate upon receipt of a command pulse a much narrower toggle pulse to prevent possible problems with propagation delays and the like from affecting the operation of the control circuit.

The control circuit includes means in the form of a single-pole double-throw switch 53 for grounding control line 52 during test modes of operation. In such modes it is desirable to prevent the generation of M6, M7 and PM pulses to facilitate repair and adjustment of the encoder and its associated decoders. This is accomplished by grounding control line 52 via the transfer contact of switch 53, thereby effectively connecting one input of each of the NAND gates 49 through 51 to a logical 0. In the normal operating mode control line 52 is not connected, effectively impressing a logical 1 on the inputs associated with that line.

It will be appreciated that while the control circuit is shown in the embodiment of a subscription television encoder, it would find use in other systems where a train of pulses in a predetermined sequence is needed in response to the application of a single command pulse. Furthermore, it must be realized that additional stages could be added to counter 48 to obtain more control pulses, and other sources of stepping pulses could be provided besides horizontal retrace pulses, without departing from the true scope and intent of the invention.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A control circuit for generating a series of pulses within a predetermined time interval in response to a command pulse preceeding said interval, comprising:

a counter responsive to an applied signal for stepping from a reset state through a series of predetermined counting states including initial and final states, said counter comprising at least two counting elements, each element having first and second stable states, wherein said initial and final counting states of said counter correspond to first and second permutations in the stable states of said elements, and wherein one of said counting elements is in said first stable state only when said counter is in said reset and final counting states;

a source of recurrent stepping pulses;

means for applying said stepping pulses to said counter after said counter reaches said initial state to step said counter from said initial state to said final state;

switch means, responsive to said elements existing in said second permutation, for interrupting the application of said stepping pulses to said counter when said counter assumes said final state, said switch means comprising a logical AND gate having an input coupled to said source of pulses and an output to the input of said counter, and having an additional input coupled to said second counting element to close said gate when said second counting element is in said first stable state;

means for applying said command pulse to said counter to step said counter from said reset state to said initial counting state at the beginning of said predetermined time interval, comprising a logical OR gate having one input coupled to the source of said command pulse, another input coupled to the output of said logical AND gate, and an output coupled to the input of said counter; and means responsive to the counting state of said counter for generating said series of pulses as said counter advances from said initial state to said final state.

2. A control circuit as described in claim 1 wherein said stepping pulses comprise horizontal retrace pulses.

3. A control circuit as described in claim 1 further including means for resetting said counter at the end of said predetermined time interval.

* * * * *